(12) United States Patent
Wang

(10) Patent No.: US 12,495,395 B2
(45) Date of Patent: Dec. 9, 2025

(54) COMMUNICATION METHOD AND APPARATUS, TERMINAL DEVICE AND NETWORK DEVICE

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 329 days.

(21) Appl. No.: 18/146,683

(22) Filed: Dec. 27, 2022

(65) Prior Publication Data
US 2023/0209503 A1    Jun. 29, 2023

Related U.S. Application Data

(63) Continuation of application No. PCT/CN2020/114604, filed on Sep. 10, 2020.

(51) Int. Cl.
*H04W 4/00* (2018.01)
*H04W 68/02* (2009.01)
(Continued)

(52) U.S. Cl.
CPC ........... *H04W 68/02* (2013.01); *H04W 76/10* (2018.02); *H04W 76/20* (2018.02); *H04W 88/06* (2013.01); *H04W 88/10* (2013.01)

(58) Field of Classification Search
None
See application file for complete search history.

(56) References Cited

U.S. PATENT DOCUMENTS

2007/0105564 A1    5/2007  Harris
2013/0170347 A1    7/2013  Zhang et al.
(Continued)

FOREIGN PATENT DOCUMENTS

CN    101039503 A    9/2007
CN    103858512 A    6/2014
(Continued)

OTHER PUBLICATIONS

"3rd Generation Partnership Project; Technical Specification Group Services and System Aspects; Study on system enablers for devices having multiple Universal Subscriber Identity Modules (USIM) (Release 17)", 3GPP Draft; SP-200693. ZIP 23761-100, 3rd Generation Partnership Project (3GPP) Mobile Competence Centre ; 650, Route Deslucioles ; F-06921 Sophia-Antipolis Cedex; France, Sep. 8, 2020 (Sep. 8, 2020), XP051932719, items [6.1],[6.3], 104 pages.
(Continued)

*Primary Examiner* — Bob A Phunkulh
(74) *Attorney, Agent, or Firm* — PERKINS COIE LLP

(57) ABSTRACT

Provided are a communication method and apparatus, a terminal device and a network device. The method comprises: a terminal device receiving a paging message sent by a first network, wherein the first network is a network corresponding to a first communication card in the terminal device; and the terminal device determining, on the basis of a paging reason in the paging message, whether to respond to the paging message, and indicating, when determining not to respond to the paging message, to the first network that the terminal device does not respond to the paging message.

11 Claims, 6 Drawing Sheets

---

A terminal device receives a paging message from a first network, and the first network is a network corresponding to a first communication card in the terminal device  — 201

The terminal device determines whether to respond to the paging message based on a paging cause in the paging message, and indicates to the first network that the terminal device does not respond to the paging message in response to determining not to respond to the paging message  — 202

(51) Int. Cl.
  *H04W 76/10* (2018.01)
  *H04W 76/20* (2018.01)
  *H04W 88/06* (2009.01)
  *H04W 88/10* (2009.01)

(56) References Cited

U.S. PATENT DOCUMENTS

| | | | |
|---|---|---|---|
| 2019/0320411 A1 | 10/2019 | Gaigalas et al. | |
| 2019/0387570 A1 | 12/2019 | Byun et al. | |
| 2020/0267533 A1 | 8/2020 | Zhang et al. | |
| 2020/0305118 A1* | 9/2020 | Ryu | H04W 76/10 |
| 2020/0329523 A1* | 10/2020 | Yi | H04W 72/51 |
| 2020/0351818 A1* | 11/2020 | Park | H04W 52/0216 |
| 2021/0014667 A1* | 1/2021 | Lovlekar | H04W 12/72 |
| 2021/0127256 A1* | 4/2021 | Li | H04W 60/005 |
| 2022/0191778 A1* | 6/2022 | Kumar | H04W 36/142 |
| 2022/0191824 A1* | 6/2022 | Kumar | H04W 68/02 |
| 2022/0210764 A1* | 6/2022 | Hong | H04W 68/005 |
| 2022/0279469 A1* | 9/2022 | Ingale | H04W 60/005 |
| 2022/0286950 A1* | 9/2022 | Kumar | H04W 60/005 |
| 2022/0312368 A1* | 9/2022 | Zhang | H04W 12/068 |
| 2022/0312538 A1* | 9/2022 | Zhang | H04W 68/005 |
| 2022/0330194 A1* | 10/2022 | Kumar | H04W 68/02 |
| 2022/0394666 A1* | 12/2022 | Gao | H04W 74/0825 |
| 2023/0007732 A1* | 1/2023 | Zhang | H04W 76/15 |
| 2023/0093965 A1* | 3/2023 | Velev | H04W 60/005 455/458 |
| 2023/0269702 A1* | 8/2023 | Zhang | H04W 68/12 455/558 |
| 2023/0345417 A1* | 10/2023 | Wu | H04W 68/00 |

FOREIGN PATENT DOCUMENTS

| | | |
|---|---|---|
| CN | 109788494 A | 5/2019 |
| CN | 111587606 A | 8/2020 |
| JP | 2022545331 A | 10/2022 |
| WO | 2007058789 A2 | 5/2007 |
| WO | 2018005419 A1 | 1/2018 |
| WO | 2018013021 A1 | 1/2018 |

OTHER PUBLICATIONS

Nokia et al: "KI#3: New solution: Notification on user plane of a master PLMN", 3GPP Draft; S2-2005018, Brd Generation Partnership Project (3GPP), Mobile Competence Centre ; 650, Route Des Lucioles ; F-06921 Sophia-Antipolis Cedex; France vol. SA WG2, No. Online; Aug. 19, 2020-Sep. 2, 2020 Aug. 13, 2020 (Aug. 13, 2020), XP051919913, the whole document, 5 pages.

Nokia et al: "Paging Reception for MUSIM"3GPP Draft; R2-2007353, 3rd Generation Partnership Project (3GPP), Mobile Competence Centre ; 650, Route Des Lucioles ; E-06921 Sophia-Antipolis Cedex; France vol. RAN WG2, No. Electronic; Aug. 17, 2020-Aug. 28, 2020 Aug. 7, 2020 (Aug. 7, 2020), XP052360470, the whole document, 3 pages.

Supplementary European Search Report in the European application No. 20952792.8, mailed on Oct. 2, 2023, 16 pages.

3GPP TSG-RAN WG2 Meeting #111-e R2-2007208, Online, Aug. 17-28, 2020, Source: ZTE Corporation, Sanechips, Title: Consideration on the RAN2 issues of the Multi-SIM, Agenda item: 8.3, Document for: Discussion and Decision. pp. 1-5.

First Office Action of the Japanese application No. 2023-515878, issued on Jun. 21, 2024. 9 pages with English translation.

First Office Action of the Chinese application No. 202310898411.6, issued on Sep. 2, 2024. 20 pages with English translation.

3GPP TR 23.761 V1.0.0 (Sep. 2020), 3rd Generation Partnership Project; Technical Specification Group Services and System Aspects; Study on system enablers for devices having multiple Universal Subscriber Identity Modules (USIM) (Release 17). section 6.1-6.3.

SA WG2 Meeting #139E S2-2003893, Jun. 1-12, 2020, Elbonia, Source: Qualcomm Incorporated, Title: Update solution #1 of Handling of MT service with Paging Cause , Document for: Discussion, Agenda Item: 8.4, Work Item / Release: FS_MUSIM /Rel-17. pp. 1-6.

LG Electronics. "KI #1, Sol #12: Update to remove ENs", SA WG2 Meeting #140E (e-meeting) S2-2005301, Sep. 1, 2020 (Sep. 1, 2020).

International Search Report in the international application No. PCT/CN2020/114604, mailed on May 31, 2021.

Written Opinion of the International Search Authority in the international application No. PCT/CN2020/114604, mailed on May 31, 2021.

3GPP TR 23.761 V0.4.0 (Jun. 2020), 3rd Generation Partnership Project; Technical Specification Group Services and System Aspects; Study on system enablers for devices having multiple Universal Subscriber Identity Modules (USIM) (Release 17).

3GPP TSG-RAN WG2 #101 R2-1803462, Athens, Greece, Feb. 26-Mar. 2, 2018; Agenda item: 10.4.1.3.3; Source: Nokia, Nokia Shanghai Bell; Title: Access Control impacts to NR RRC establishment cause.

Office Action of the Indian application No. 202317017898, issued on Mar. 6, 2024, 7 pages with English translation.

First Office Action of the European application No. 20952792.8, issued on Apr. 17, 2024, 7 pages.

Hearing Notice of the Indian application No. 202317017898, issued on Feb. 11, 2025, 2 pages with English translation.

Supplementary European Search Report in the European application No. 25192642.4, mailed on Sep. 1, 2025.

* cited by examiner

COMMUNICATION METHOD AND APPARATUS, TERMINAL DEVICE AND NETWORK DEVICE

CROSS-REFERENCE TO RELATED APPLICATION

This is a continuation of International Application No. PCT/CN2020/114604 filed on Sep. 10, 2020, the disclosure of which is hereby incorporated by reference in its entirety.

BACKGROUND

A dual SIM mobile phone means that one mobile phone can hold two communication cards meanwhile. At present, when one communication card in the dual SIM mobile phone is in service and the other communication card also needs to be in service, for example, the other communication card receives paging and needs to receive services, or the other communication card initiates services, there will be a problem that the services of two communication cards conflict, and thus how to deal with the services of the other communication card needs to be solved.

SUMMARY

Embodiments of the present disclosure relate to the technical field of mobile communications, and provide a communication method and device, a terminal device and a network device.

The embodiments of the present disclosure provide a communication method, which includes the following operations.

A terminal device receives a paging message from a first network, and the first network is a network corresponding to a first communication card in the terminal device.

The terminal device determines whether to respond to the paging message based on a paging cause in the paging message, and indicates to the first network that the terminal device does not respond to the paging message in response to determining not to respond to the paging message.

The embodiments of the present disclosure provide a communication method, which includes the following operations.

A first base station transmits a paging message to a terminal device. The first base station is a base station corresponding to a first communication card in the terminal device, and a paging cause in the paging message is used for the terminal device to determine whether to respond to the paging message.

The first base station receives indication information from the terminal device, and the indication information is used for indicating that the terminal device does not respond to the paging message.

The embodiments of the present disclosure provide a communication method, which includes the following operations.

A terminal device receives service data from a second network. The second network is a network corresponding to a second communication card in the terminal device, and the terminal device also has a first communication card.

The terminal device determines a radio resource control (RRC) connection cause of the first communication card, and transmits an RRC connection establishment request message or an RRC connection resume request message to a first network based on the RRC connection cause. The first network is a network corresponding to the first communication card of the terminal device.

The embodiments of the disclosure provide a terminal device, which includes a processor and a memory. The memory is configured to store a computer program, and the processor is configured to call and run the computer program stored in the memory to execute the communication method described above.

The embodiments of the disclosure provide a network device, which includes a processor and a memory. The memory is configured to store a computer program, and the processor is configured to call and run the computer program stored in the memory to execute the communication method described above.

The embodiments of the disclosure provide a chip, which is used to achieve the communication method described above.

Specifically, the chip includes a processor. The processor is configured to call a computer program from a memory and run the computer program, to cause a device mounted with the chip to execute the communication method described above.

The embodiments of the disclosure provide a computer readable storage medium. The computer readable storage medium is used to store a computer program that causes a computer to execute the communication method described above.

The embodiments of the disclosure provide a computer program product, which includes computer program instructions that cause a computer to execute the communication method described above.

The embodiments of the disclosure provide a computer program. The computer program, when running on a computer, causes the computer to execute the communication method described above.

According to the above technical solution, after receiving a paging message corresponding to a first communication card, a terminal device determines whether to respond to the paging message based on a paging cause in the paging message, and indicates to a network that the terminal device does not respond to the paging message in response to determining not to respond to the paging message. Because the paging cause indicates the service or cause that triggers the paging message, the terminal device may determine whether to respond to the paging message based on the paging cause. Responding to the paging message represents that the first communication card of the terminal device receives a service corresponding to the paging message, and not-responding to the paging message represents that the first communication card of the terminal device does not receive the service corresponding to the paging message, thereby ensuring that high-priority services may be performed normally and guarantying the user experience. For a dual SIM terminal device, the dual SIM operations of the terminal device coordinated with each other are ensured, that is, one communication card (such as, the first communication card) does not affect the other communication card (such as, the second communication card).

BRIEF DESCRIPTION OF THE DRAWINGS

The drawings described herein are intended to provide a further understanding of the present disclosure and form a part of the present disclosure. The schematic embodiments of the present disclosure and the description thereof are intended to explain the present disclosure and do not constitute an improper limitation of the present disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Long Term Evolution (LTE) system, an LTE Frequency Division Duplex (FDD) system, an LTE Time Division Duplex (TDD) system, a 5G communication system or a future communication system.

Figure 1:
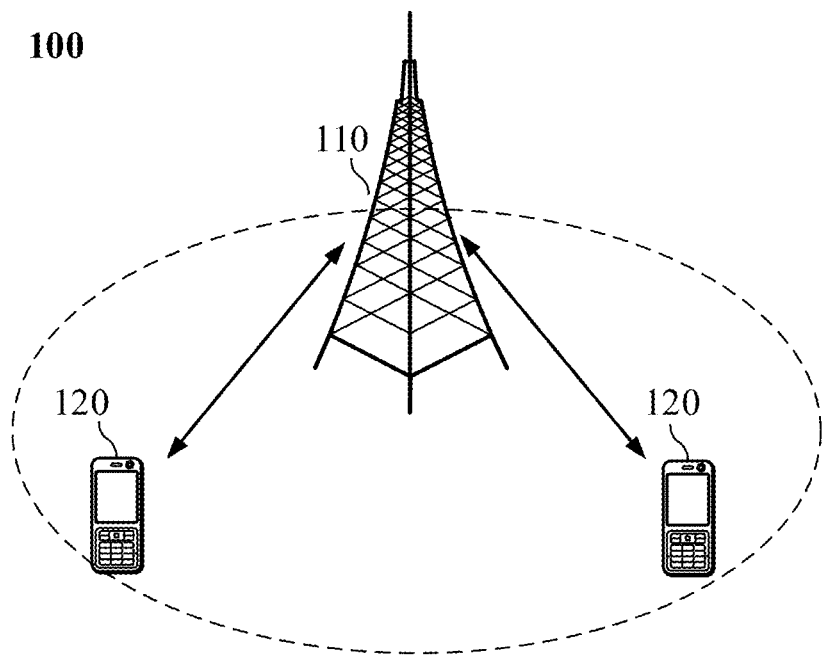
FIG. 1 is a schematic diagram of a communication system architecture according to an embodiment of the present disclosure.

Exemplarily, a communication system 100 to which the embodiments of the present disclosure are applied is illustrated in FIG. 1. The communication system 100 may include a network device 110. The network device 110 may be a device that communicates with a terminal device 120 (also referred to as a communication terminal, a terminal). The network device 110 may provide communication coverage for a specific geographic area and may communicate with a terminal device within the coverage area. In at least one example, the network device 110 may be an Evolutional Node B (eNB or eNodeB) in the LTE system or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future communication system or the like.

The communication system 100 also includes at least one terminal device 120 located within the coverage of the network device 110. The "terminal" used herein includes, but is not limited to, connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another terminal arranged to receive/transmit a communication signal; and/or an Internet of Things (IoT) device. A terminal device configured to communicate via a wireless interface may be referred to as a "wireless communication terminal", "wireless terminal" or "mobile terminal". Examples of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager, Internet/intranet access, a Web browser, memo pad, calendar and/or Global Positioning System (GPS) receiver; and a conventional laptop and/or palmtop receiver or other electronic devices including a radio telephone transceiver. The terminal device may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 120.

In one example, the 5G communication system or 5G network may also be referred to as a New Radio (NR) system or NR network.

FIG. 1 exemplarily illustrates one network device and two terminal devices. In one example, the communication system 100 may include multiple network devices and another number of terminal devices may be included within the coverage of each network device, which is not limited in the embodiments of the present disclosure.

In one example, the communication system 100 may also include another network entity such as a network controller or a mobility management entity, which is not limited in the embodiments of the present disclosure.

It is to be understood that a device with communication function in the network/system in the embodiments of the present disclosure may be referred to as a communication device. Taking the communication system 100 illustrated in FIG. 1 as an example, communication devices may include the network device 110 and the terminal 120 with the communication function. The network device 110 and the terminal 120 may be specific devices mentioned above, and details are not described herein. The communication device may further include another device in the communication system 100, for example, another network entity such as a network controller or a mobility management entity, which is not limited in the embodiments of the present disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

To facilitate understanding of the technical solutions of the embodiments of the present disclosure, the technical solutions related to the embodiments of the present disclosure are described below.

With the pursuit of speed, latency, high-speed mobility and energy efficiency, as well as the diversity and complexity of services in future life, the $3^{rd}$ Generation Partnership Project (3GPP) began to research and develop 5G. The main application scenarios of 5G are: enhanced Mobile Broadband (eMBB), Ultra-Reliable Low-Latency Communications (URLLC), and massive Machine-Type Communications (mMTC).

On one hand, eMBB still aims to acquiring multimedia content, services and data by users, and its demand is growing rapidly. On the other hand, since the eMBB may be deployed in different scenarios, such as indoor, urban, rural scenarios, etc., and the differences in capabilities and requirements for the different scenarios are relatively large, it cannot be generalized and must be analyzed in detail with reference to specific deployment scenarios. Typical applications of URLLC include: industrial automation, power automation, telemedicine operation (surgery), traffic safety and so on. Typical characteristics of mMTC include: high connection density, small data size, latency-insensitive services, low cost and long service life of modules, and so on.

RRC Status 5G defines a new Radio Resource Control (RRC) state, i.e., RRC_INACTIVE state, for the purpose of reducing air interface signaling and rapidly recovering wireless connections and data service. This state is different from RRC_IDLE state and RRC_ACTIVE state.

1) RRC_IDLE state (referred to as an idle state for short): mobility is terminal device-based cell selection and reselection, paging is initiated by a Core Network (CN), and a paging area is configured by the CN. There is no terminal device context and no RRC connection on the base station side.

2) RRC_CONNECTED state (referred to as a connected state for short): there is an RRC connection, and there are terminal device context on both the base station side and terminal device side. The network side knows that the location of the terminal device is in a specific cell level. Mobility is controlled by the network side. Unicast data may be transmitted between the terminal device and the base station.

3) RRC_INACTIVE state (referred to as an inactive state for short): mobility is terminal device-based cell selection and reselection, there is a connection between an access network and a core network, there is terminal device context on a certain base station, paging is triggered by a Radio Access Network (RAN), an RAN-based paging area is managed by the RAN, and the network side knows that the location of the terminal device is in a RAN-based paging area level. It is unnecessary to inform the network side when the terminal device moves within the Radio Access Network Notification Area (RNA) configured by the RAN, but it is necessary to inform the network side when the terminal device moves out the RNA.

Dual SIM Dual Standby/Dual Network Dual Standby

A dual SIM dual standby mobile phone means that one mobile phone can hold two communication cards meanwhile, and the two communication cards are in standby. Dual SIM dual standby generally refers to dual SIM dual standby of the same network type, such as, dual SIM dual standby of GSM network, dual SIM dual standby of CDMA network, or dual SIM dual standby of PHS network.

Dual network dual standby means that one mobile phone can be inserted into two communication cards with different networks meanwhile, and keeps the communication cards on meanwhile, allowing a user to dial, answer, and send and receive short messages freely without switching the networks.

At present, mobile phones generally do not support completely dual uplink/downlink (referred to as dual active). Dual uplink/downlink means that the mobile phone simultaneously performs uplink transmission and downlink reception of data on two networks through two communication cards. Generally, most mobile phones only support single uplink/downlink or single uplink/dual downlink, which means that mobile phones may only perform services on one communication card at a certain time. However, the realization of dual active is a trend of mobile phone development in the future. In 5G, for two communication cards of the mobile phone that supports dual SIM dual standby or dual network dual standby, one communication card may camp on an LTE cell and the other communication card may camp on an NR cell; or both the communication cards camp on the NR cell. On the other hand, the two communication cards may be communication cards of the same operator or communication cards of different operators.

At present, when one communication card in the dual SIM mobile phone is in service and the other communication card also needs to be in service, for example, the other communication card receives paging and needs to receive services or the other communication card initiates services, the services of the two communication cards will conflict, and thus problems of how to deal with the services of the other communication card and how to coordinate the services of the two communication cards need to be solved. Therefore, the technical solutions of the embodiments of the present disclosure are proposed below.

It should be noted that the "terminal device" in the embodiments of the present disclosure may be a mobile phone, a tablet computer, a wearable device and so on. The terminal device has at least two communication cards, for example, the terminal device has two communication cards or three communication cards. The following embodiments are described by taking two communication cards as an example, which is not limited thereto. The technical solutions of the embodiments of the present disclosure are also applicable to the scheme of more than two communication cards.

It should be noted that types of the first communication card and the second communication card are not limited by the embodiments of the present disclosure. For example, both the first communication card and the second communication card are Subscriber Identity Module (SIM) cards. For example, both the first communication card and the second communication card are Universal Subscriber Identity Module (USIM) cards. For example, the first communication card is a SIM card and the second communication card is a USIM card. For example, the first communication card is a USIM card and the second communication card is a SIM card.

On another aspect, network types supported by the first communication card and the second communication card are not limited by the embodiments of the present disclosure. For example, the first communication card supports an LTE network (that is, a first base station corresponding to the first communication card is an LTE base station), and the second communication card supports an NR network (that is, a second base station corresponding to the second communication card is an NR base station). For example, both the first communication card and the second communication card support NR networks (that is, second base stations corresponding to the first communication card and the second communication card are both NR base stations).

On yet another aspect, operators to which the first communication card and the second communication card belong are not limited by the embodiments of the present disclosure. For example, the first communication card and the second communication card may belong to the same operator or different operators.

Figure 2:
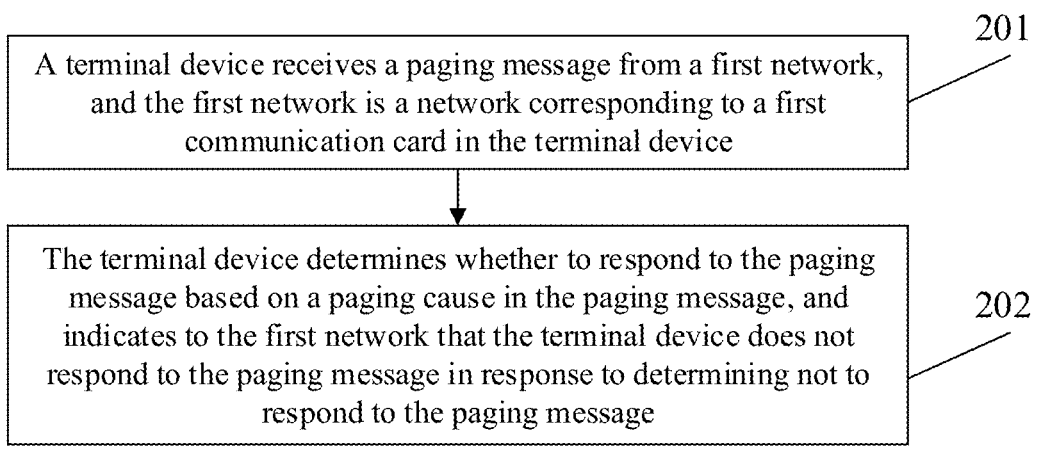
FIG. 2 is a first flowchart of a communication method according to an embodiment of the present disclosure.

FIG. 2 is a first flowchart of a communication method according to an embodiment of the present disclosure. As illustrated in FIG. 2, the communication method includes the following operations.

In 201: a terminal device receives a paging message from a first network, and the first network is a network corresponding to a first communication card in the terminal device.

In an optional implementation of the present application, the terminal device also receives service data from a second network, and the second network is a network corresponding to a second communication card in the terminal device.

For example, the terminal device has a USIM-A card (that is, the second communication card) and a USIM-B card (that is, the first communication card). The terminal device receives services on a network corresponding to the USIM-A card (that is, the second network), and the terminal device receives a paging message on a network corresponding to the USIM-B card (that is, the first network).

Figure 3:
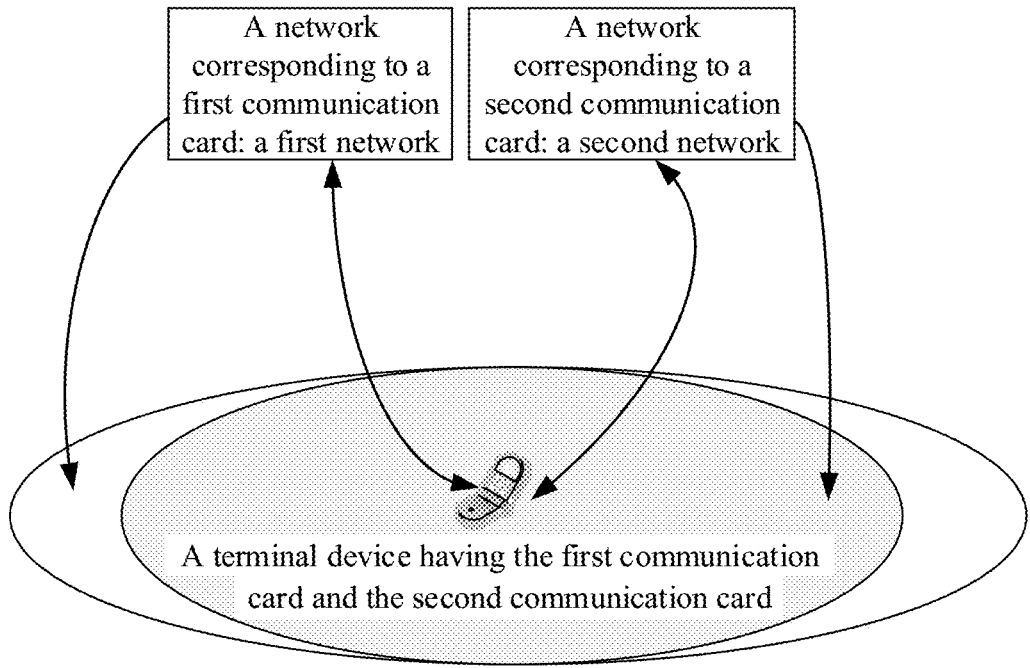
FIG. 3 is a principle diagram of dual communication cards according to an embodiment of the present disclosure.

Referring to FIG. 3, the terminal device has the first communication card and the second communication card, a network corresponding to the first communication card is the first network, and a network corresponding to the second communication card is the second network. On one hand, the terminal device may access the first network through the first communication card to implement the services on the first network. On the other hand, the terminal device may access the second network through the second communication card to implement the services on the second network. The types of the first network and the second network may be the same or different. For example, the first network is an LTE network and the second network is an NR network. For another example, both the first network and the second network are NR networks.

In the embodiments of the present disclosure, the first communication card of the terminal device is in an idle state or an inactive state. The second communication card of the terminal device is in a connected state. For example, there are two USIM cards in the terminal device, namely USIM-A card and USIM-B card. The USIM-A card has ongoing services and is in the connected state; and the USIM-B card is in an idle state or an inactive state and receives the paging message.

It should be noted that the communication between the terminal device and the first network is realized through the first communication card, and the communication between the terminal device and the second network is realized through the second communication card. For example, there are two USIM cards in the terminal device, namely USIM-A card and USIM-B card. The terminal device may communicate with the first network through the USIM-A card, and the terminal device may communicate with the second network through the USIM-B card.

In 202: the terminal device determines whether to respond to the paging message based on a paging cause in the paging message, and indicates to the first network that the terminal device does not respond to the paging message in response to determining not to respond to the paging message.

In the embodiments of the present disclosure, the operation that the terminal device receives the paging message form the first network is specifically that an Access Stratum (AS) of the first communication card of the terminal device receives the paging message sent by the first network. Here, the paging message carries the paging cause. The paging cause is used for indicating the service or cause that triggers the paging message, and the paging cause is used for indicating that the paging message is triggered by a voice call service or a video call service.

It should be noted that interactions between the terminal device and the network in the present disclosure essentially refers to interactions between the first communication card in the terminal device and the network. An AS of the terminal device essentially refers to the AS of the first communication card in the terminal device, and likewise, a Non-Access Stratum (NAS) of the terminal device essentially refers to a NAS of the first communication card in the terminal device.

In the embodiments of the present disclosure, after the AS of the first communication card of the terminal device receives the paging message from the first network, the NAS may determine whether to respond to the paging message based on the paging cause in the paging message, or the AS may determine whether to respond to the paging message based on the paging cause in the paging message. The following are described according to different cases.

First case: the NAS of the terminal device determines whether to respond to the paging message based on the paging cause in the paging message.

In this case, the paging cause is transparent to the AS. After receiving the paging message sent by the first network, the AS of the terminal device transmits the paging cause in the paging message to the NAS of the terminal device; and the NAS of the terminal device determines whether to respond to the paging message based on the paging cause. For example, in a case where the paging cause indicates a paging triggered by the voice service, it is determined to respond the paging message; otherwise, it is determined not to response the paging message.

A) in an optional implementation, the first communication card is in an idle state, the NAS of the terminal device determines first information based on the paging cause and transmits the first information to the AS of the terminal device; and the AS of the terminal device initiates an RRC connection establishment process based on the first information.

In an optional implementation, the first information includes at least one of an access category, an RRC connection cause or an NAS message.

The access category is access category 0.

The RRC connection cause is an mt-Access.

The NAS message is a service request message.

In another optional implementation, the first information includes at least one of an access category, an RRC connection cause or an NAS message.

The access category is access category 3.

The RRC connection cause is an mo-Signalling.

The NAS message carries first indication information, and the first indication information is used for indicating that the terminal device does not respond to the paging message, and/or, instructing a core network to stop paging the terminal device.

In the above solution, the access category 0 and the access category 3 are two access categories, which may be referred to as Table 1 illustrated below. A type of access attempt of the access category 0 is MO signaling resulting from paging, and a type of access attempt of the access category 3 is MO signaling on NAS level resulting from other than paging.

TABLE 1

| Access category | UE-related barring conditions | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signalling on RRC level resulting from other than paging |
| 9-31 |  | Reserved standardized Access Categories |
| 32-63 | All | Based on operator classification |

In the above solution, the first indication information may also be referred to as busy indication, and the first indication information is used for indicating that the terminal device does not respond to the paging message, and/or, instructing the core network to stop paging the terminal device. Here, the operation that the terminal device does not respond to the paging message may also indicate that the terminal device does not receive service data corresponding to the paging message. After receiving the first indication information, the core network stops paging the terminal device.

In the solution, the operation that the AS of the terminal device initiates the RRC connection establishment process based on the first information includes the following operations.

The AS of the terminal device determines whether to allow access to the first network based on the access category; and in a case where the access to the first network is allowed, the AS of the terminal device transmits an RRC connection establishment request message to the first network, and the RRC connection establishment request message carries the RRC connection cause. Further, the AS of the terminal device receives an RRC connection establishment message from the first network, and transmits an RRC connection establishment completion message carrying the NAS message to the first network. In such way, the RRC connection establishment process is completed.

Here, the operation of determining whether to allow access to the first network based on the access category may be realized in the following manner. A UAC barring information set (UAC-BarringInfoSet) corresponding to the access category is determined, and an access control operation is performed based on the UAC-BarringInfoSet, thereby determining whether to allow access to the first network. Here, the UAC-BarringInfoSet includes: UAC barring factor (uac-BarringFactor); UAC barring time (uac-BarringTime); and UAC barring for access identity (uac-BarringForAccessIdentity).

The operation that the access control operation is performed based on the UAC-BarringInfoSet includes the following operations.

1) When the corresponding bit of the access identity in uac-BarringForAccessIdentity is set to 0, it indicates that access is allowed, and when the corresponding bit is set to 1, it is necessary to further decide through the following operations.

2) A rand is generated, and the range of the rand is 0≤rand<1. When the rand is lower than uac-BarringFactor, it indicates that access is allowed, otherwise, access is disabled. When access is disabled, the rand is generated, the range of the rand is 0≤rand<1, Timer T390 is enabled and T390=(0.7+0.6×rand)×uac-BarringTime.

B) In an optional implementation, the first communication card is in an inactive state, the NAS of the terminal device determines second information based on the paging cause and transmits the second information to the AS of the terminal device; and the AS of the terminal device initiates an RRC connection resume process based on the second information.

In an optional implementation, the second information includes at least one of: an access category, an RRC connection cause, or second indication information.

The access category is access category 0.

The RRC connection cause is an mt-Access.

The second indication information is used for indicating whether the first communication card responds to the paging message.

In another optional implementation, the second information includes at least one of: an access category, an RRC connection cause, or second indication information.

The access category is access category 3.

The RRC connection cause is an mo-Signalling.

The second indication information is used for indicating whether the first communication card responds to the paging message.

In the above solution, the operation that the AS of the terminal device initiates the RRC connection resume process based on the second information includes the following operations.

The AS of the terminal device transmits an RRC connection resume request message to the first network, and in a case where the second indication information indicates that the terminal device does not respond to the paging message, there are two indication manners.

1. Explicit indication manner: the RRC connection resume request message carries third indication information for indicating that the terminal device does not respond to the paging message.

2. Implicit indication manner: a first logical channel identifier (LCID) of a common control channel (CCCH)

corresponding to the RRC connection resume request message is used for indicating that the terminal device does not respond to the paging message.

For the implicit indication manner, a new LCID (referred to as the first LCID) is defined for the CCCH, and the new LCID is used for indicating that the terminal device does not respond to the paging message or indicating that the terminal device initiates the RRC connection resume for the purpose of informing the network side that the terminal device does not respond to the paging. Specifically, the terminal device transmits the RRC connection resume request message through the CCCH (that is, the RRC connection resume request message is carried in the CCCH), and the LCID of the CCCH is used for indicating that the terminal device does not respond to the paging message. Correspondingly, a header corresponding to the RRC connection resume request message in a media access control transport block (MAC TB) is a first header, and an LCID in the first header is the first LCID, that is, the header corresponding to the RRC connection resume request message in the MAC TB carries the first LCID.

Second case: the AS of the terminal device determines whether to respond to the paging message based on the paging cause in the paging message.

In this case, the paging cause is non-transparent to the AS. After receiving the paging message sent by the first network, the AS of the terminal device acquires the paging cause in the paging message; and the NAS of the terminal device determines whether to respond to the paging message based on the paging cause. For example, in a case where the paging cause indicates a paging triggered by the voice service, it is determined to response the paging message; otherwise, it is determined not to response the paging message.

C) In an optional implementation, the first communication card is in an inactive state, and the AS of the terminal device initiates an RRC connection resume process.

In the above solution, the operation that the AS of the terminal device initiates the RRC connection resume process includes the following operations.

The AS of the terminal device transmits an RRC connection resume request message to the first network, and in a case where the AS determines not to response to the paging message, there are two indication manners.

1. Explicit indication manner: the RRC connection resume request message carries third indication information for indicating that the terminal device does not respond to the paging message.

2. Implicit indication manner: a first LCID of a CCCH corresponding to the RRC connection resume request message is used for indicating that the terminal device does not respond to the paging message.

For the implicit indication manner, a new LCID (referred to as the first LCID) is defined for the CCCH, and the new LCID is used for indicating that the terminal device does not respond to the paging message, or indicating that the terminal device initiates the RRC connection resume for the purpose of informing the network side that the terminal device does not respond to the paging. Specifically, the terminal device transmits the RRC connection resume request message through the CCCH (that is, the RRC connection resume request message is carried in the CCCH), and the LCID of the CCCH is used for indicating that the terminal device does not respond to the paging message. Correspondingly, a header corresponding to the RRC connection resume request message in an MAC TB is a first header, and an LCID in the first header is the first LCID, that is, the header corresponding to the RRC connection resume request message in the MAC TB carries the first LCID.

Figure 4:
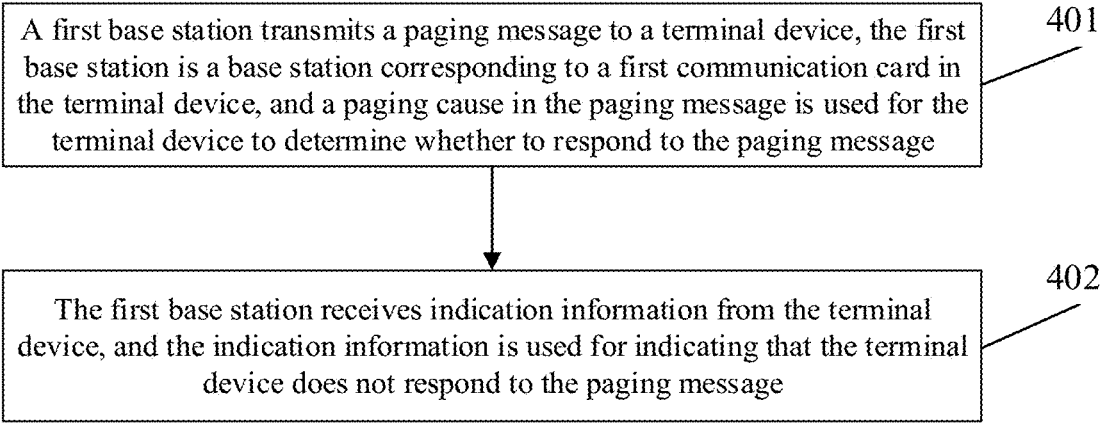
FIG. 4 is a second flowchart of a communication method according to an embodiment of the present disclosure.

FIG. 4 is a second flowchart of a communication method according to an embodiment of the present disclosure. As illustrated in FIG. 4, the communication method includes the following operations.

In 401: a first base station transmits a paging message to a terminal device. The first base station is a base station corresponding to a first communication card in the terminal device, and a paging cause in the paging message is used for the terminal device to determine whether to respond to the paging message.

In the embodiments of the present disclosure, the terminal device has the first communication card and a second communication card, a network corresponding to the first communication card is a first network, and a network corresponding to the second communication card is a second network. A base station covering the first network is called the first base station (that is, the base station corresponding to the first communication card), and the first base station may also be called a target base station. The first base station transmits the paging message to the terminal device, and the paging message is used for paging the first communication card of the terminal device. The paging cause in the paging message is used for the terminal device to determine whether to respond to the paging message. Here, the operation that the terminal device determines whether to respond to the paging message based on the paging cause in the paging message may be described with reference to the related method in FIG. 2, and details are not described.

In 402: the first base station receives indication information from the terminal device, and the indication information is used for indicating that the terminal device does not respond to the paging message.

In the embodiments of the present disclosure, the terminal device is in an inactive state, corresponding to solution B) in the first case or solution C) in the second case of the related method in FIG. 2, the operation that the first base station receives the indication information from the terminal device may be implemented in the following manners.

1. Explicit indication manner: the first base station receives an RRC connection resume request message from the terminal device, and the RRC connection resume request message carries third indication information for indicating that the terminal device does not respond to the paging message.

2. Implicit indication manner: the first base station receives the RRC connection resume request message from the terminal device, and a first LCID of a CCCH corresponding to the RRC connection resume request message is used for indicating that the terminal device does not respond to the paging message.

For the implicit indication manner, a new LCID (referred to as the first LCID) is defined for the CCCH, and the new LCID is used for indicating that the terminal device does not respond to the paging message, or indicating that the terminal device initiates the RRC connection resume for the purpose of informing the network side that the terminal device does not respond to the paging. Specifically, the terminal device transmits the RRC connection resume request message through the CCCH (that is, the RRC connection resume request message is carried in the CCCH), and the LCID of the CCCH is used for indicating that the terminal device does not respond to the paging message. Correspondingly, a header corresponding to the RRC connection resume request message in an MAC TB is a first header, and an LCID in the first header is the first LCID, that is, the header corresponding to the RRC connection resume request message in the MAC TB carries the first LCID.

In the embodiments of that present disclosure, after receiving the indication information, the first base station transmits a context request message to a second base station, the context request message carries fourth indication information, and the fourth indication information is used for indicating that the terminal device does not respond to the paging message, and/or the fourth indication information is used for the second base station to decide not to migrate a context of the terminal device. The first base station receives a context request failure message from the second base station, and the context request failure message carries an RRC release message. The first base station transmits the RRC release message to the terminal device. Here, in one example, the second base station is an anchor base station.

In the above solution, after receiving the context request message, the second base station decides not to migrate the context of the terminal device according to the fourth indication information, and transmits the context request failure message to the first base station. The context request failure message carries the RRC release message (that is, an RRCRelease PDCP PDU). Then, the first base station transmits the RRC release message to the terminal device.

In an optional implementation, the fourth indication information is forwarded to a core network control plane network element by the second base station, and the fourth indication information is used for the core network control plane network element to inform a core network user plane network element to stop transmitting downlink data of the terminal device to the second base station and buffer the downlink data.

In one example, the core network control plane network element is an AMF, the core network user plane network element is a UPF, the second base station informs the AMF of indication information (i.e., the fourth indication information) that the terminal device does not respond to paging and/or does not perform data reception, and the AMF informs the UPF to stop transmitting downlink data of the terminal device to the second base station and buffer the downlink data of the terminal device.

In the above solution, the paging message is triggered by the second base station. For example, when the downlink data of the terminal device reaches the second base station, the second base station triggers the paging for the terminal device and informs the base stations within the RNA range (such as, the first base station) to transmit the paging message to the terminal device. Here, the paging cause in the paging message is informed to the second base station by the core network control plane network element.

In one example, the core network control plane network element is the AMF, and before the second base station informs the first base station to transmit the paging message carrying the paging cause, the AMF informs the second base station of the paging cause.

Figure 5:
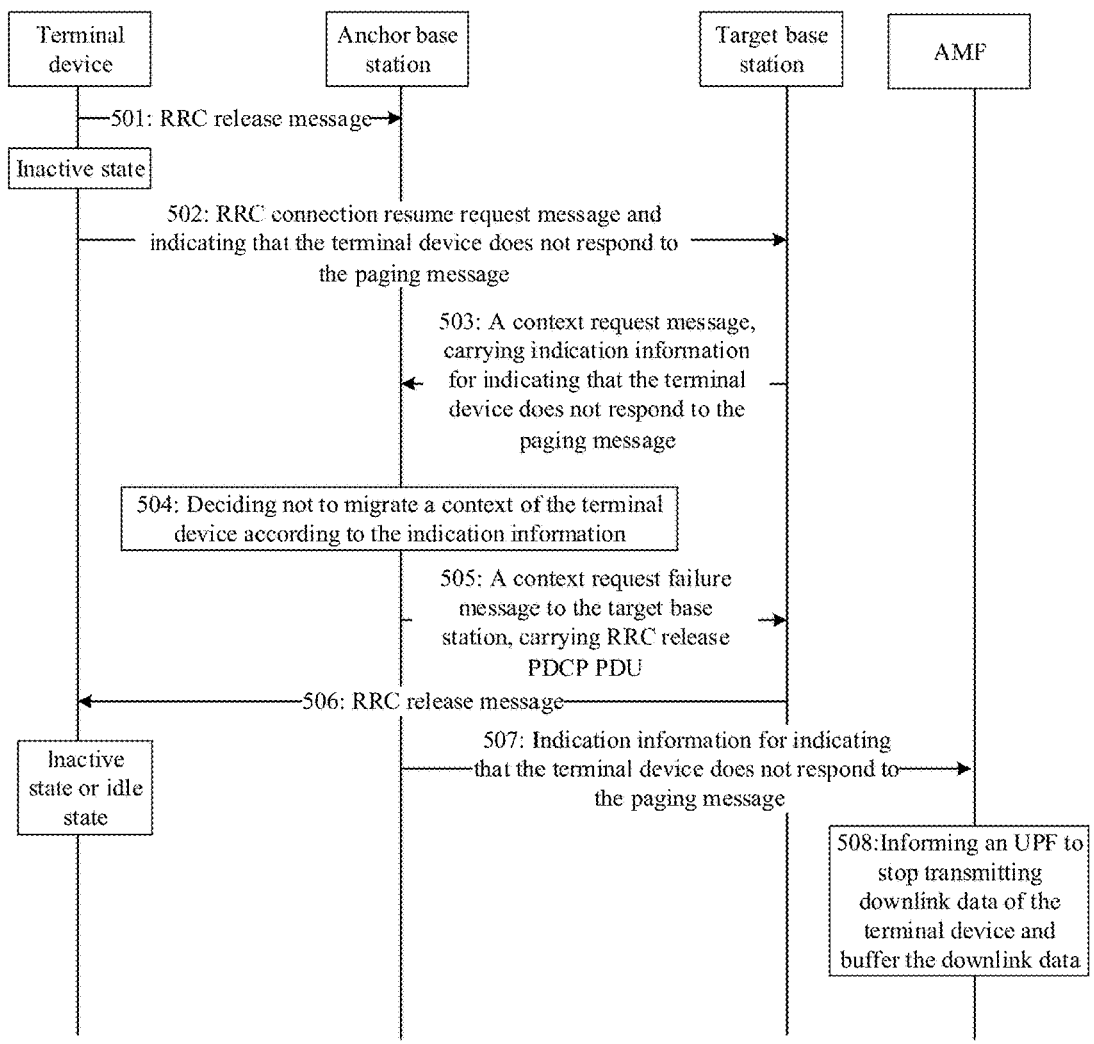
FIG. 5 is a flowchart of a method for determining that a base station does not respond to paging according to an embodiment of the present disclosure.

FIG. 5 is a flowchart of a method for determining that a base station does not respond to paging according to an embodiment of the present disclosure. As illustrated in FIG. 5, the method includes the following operations.

In 501: an anchor base station transmits an RRC release message to the terminal device.

The RRC release message carries RNA configuration information. After receiving the RRC release message, the terminal device enters an inactive state.

In 502: the terminal device transmits an RRC connection resume request message to a target base station and indicates that the terminal device does not respond to a paging message.

The terminal device transmits the RRC connection resume request message to the target base station through SRB0. In one example, the RRC connection resume request message carries a short MAC-I and an I-RNTI.

In 503: the target base station transmits a context request message to the anchor base station, and the context request message carries indication information for indicating that the terminal device does not respond to the paging message.

In 504: the anchor base station decides not to migrate a context of the terminal device according to the indication information.

In 505: the anchor base station transmits a context request failure message to the target base station, and the context request failure message carries RRC release PDCP PDU.

In 506: the target base station transmits the RRC release message to the terminal device.

Here, the target base station transmits the RRC release message to the terminal device through SRB1. After receiving the RRC release message, the terminal device enters the inactive state or an idle state.

In 507: the anchor base station transmits to the AMF indication information for indicating that the terminal device does not respond to the paging message.

In 508: the AMF informs an UPF to stop transmitting downlink data of the terminal device and buffer the downlink data.

Figure 6:
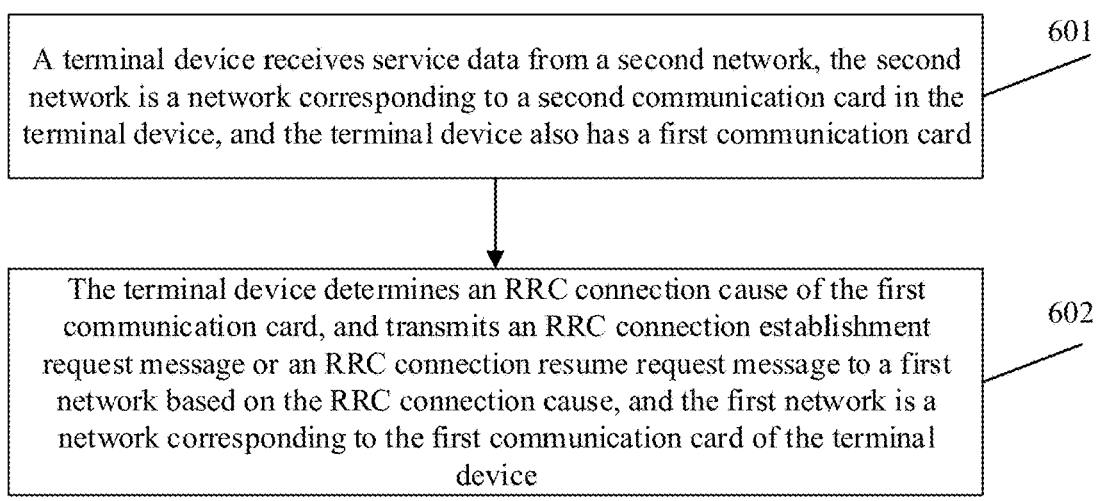
FIG. 6 is a third flowchart of a communication method according to an embodiment of the present disclosure.

FIG. 6 is a third flowchart of a communication method according to an embodiment of the present disclosure. As illustrated in FIG. 6, the communication method includes the following operations.

In 601: a terminal device receives service data from a second network. The second network is a network corresponding to a second communication card in the terminal device, and the terminal device also has a first communication card.

In the embodiments of the present disclosure, the terminal device has the first communication card and the second communication card, a network corresponding to the first communication card is a first network, and a network corresponding to the second communication card is a second network. The second communication card is in a connected state, and the terminal device receives the service data on the second network corresponding to the second communication card. The first communication card is in an idle state or an inactive state, and the terminal device performs RRC connection establishment or resume of UE initial MO-data, or RRC connection establishment or resume of UE initial MO-signalling, or RRC connection establishment or resume of UE initial high-priority MO-data for the first communication card in the idle state or inactive state.

In 602: the terminal device determines an RRC connection cause of the first communication card, and transmits an RRC connection establishment request message or an RRC connection resume request message to a first network based on the RRC connection cause. The first network is a network corresponding to the first communication card of the terminal device.

In the embodiments of the present disclosure, an NAS of the terminal device triggers an RRC connection establishment or resume to an AS of the terminal device, and transmits the RRC connection cause to the AS of the terminal device, and the AS of the terminal device transmits the RRC connection establishment request message or the RRC connection resume request message to the first network based on the RRC connection cause. In one example, the terminal device transmits an RRC connection release request message to the second network.

It should be noted that, in the above solution, the AS of the terminal device essentially refers to the AS of the first communication card in the terminal device, and similarly, the NAS of the terminal device essentially refers to the NAS of the first communication card in the terminal device.

For example, the terminal device receives services through an USIM-A card, an USIM-B card of the terminal device is in an idle state or an inactive state, the NAS of the USIM-B card triggers an RRC connection establishment or resume to the AS, and the AS of the USIM-B card initiates an RRC connection establishment or resume process to a network corresponding to the USIM-B card. Further, the AS of the USIM-A card initiates an RRC connection release request to a network corresponding to the USIM-A card.

In the above solution, the RRC connection cause sent by the NAS of the first communication card to the AS may include the following.

1) The RRC connection cause is an MO-signalling or an MO-data.

2) The RRC connection cause is an emergency or a highPriorityAccess.

3) The RRC connection cause is an mo-VoiceCall, or an mo-VideoCall, or an mo-SMS.

4) The RRC connection cause is an mps-PriorityAccess or an mcs-PriorityAccess.

5) The RRC connection cause is a radio access network notification area update (ma-Update).

Figure 7:
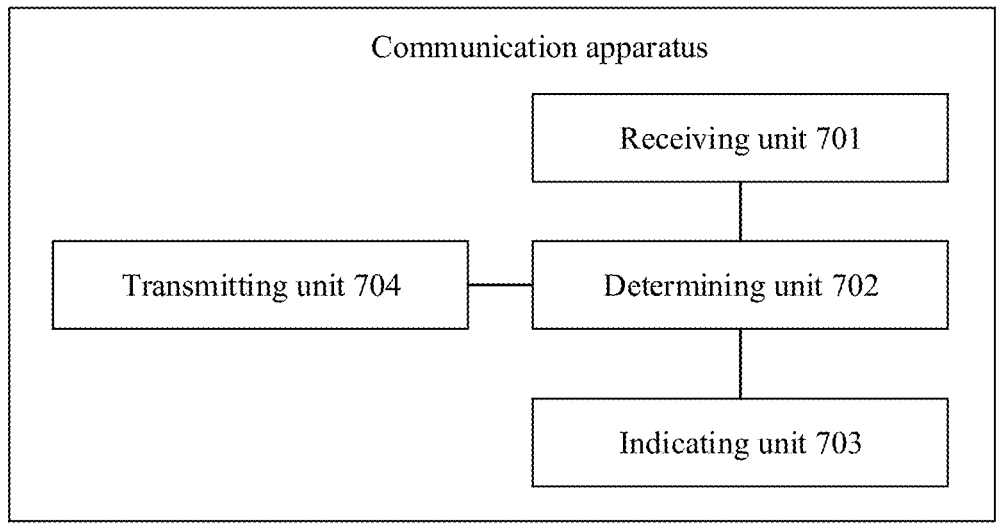
FIG. 7 is a first schematic structural composition diagram of a communication apparatus according to an embodiment of the present disclosure.

FIG. 7 is a first schematic structural composition diagram of a communication apparatus according to an embodiment of the present disclosure, which is applied to a terminal device. As illustrated in FIG. 7, the communication apparatus includes a receiving unit 701, a determining unit 702, and an indicating unit 703.

The receiving unit 701 is configured to receive a paging message from a first network. The first network is a network corresponding to a first communication card in the terminal device.

The determining unit 702 is configured to determine whether to respond to the paging message based on a paging cause in the paging message.

The indicating unit 703 is configured to, in response to determining not to respond to the paging message, indicate to the first network that the terminal device does not respond to the paging message.

In an optional implementation, the receiving unit 701 is also configured to receive service data from a second network, and the second network is a network corresponding to a second communication card in the terminal device.

In an optional implementation, the determining unit 702 is configured to determine whether to respond to the paging message through a Non-Access Stratum (NAS) of the terminal device based on the paging cause in the paging message.

In an optional implementation, the first communication card is in an idle state, and the device also includes a transmitting unit 704.

The transmitting unit 704 is configured to transmit the paging cause in the paging message to the NAS of the terminal device through an AS of the terminal device.

The determining unit 702 is also configured to determine first information through the NAS of the terminal device based on the paging cause The transmitting unit 704 is also configured to transmit the first information to the AS of the terminal device through the NAS of the terminal device; and initiate an RRC connection establishment process through the AS of the terminal device based on the first information.

In an optional implementation, the first information comprises at least one of: an access category, the access category being access category 0; an RRC connection cause, the RRC connection cause being an mt-Access; or an NAS message, the NAS message being a service request message.

In an optional implementation, the first information includes at least one of: an access category, the access category being access category 3; an RRC connection cause, the RRC connection cause being an mo-Signalling; or an NAS message, the NAS message carrying first indication information. The first indication information is used for indicating that the terminal device does not respond to the paging message, and/or, instructing a core network to stop paging the terminal device.

In an optional implementation, the determining unit 702 is configured to determine whether to allow access to the first network through the AS of the terminal device based on the access category.

The transmitting unit 704 is configured to, in a case where the access to the first network is allowed, transmit an RRC connection establishment request message to the first network through the AS of the terminal device. The RRC connection establishment request message carries the RRC connection cause.

In an optional implementation, the receiving unit 701 is also configured to receive an RRC connection establishment message from the first network through the AS of the terminal device The transmitting unit 704 is also configured to transmit an RRC connection establishment completion message to the first network. The RRC connection establishment completion message carries the NAS message.

In an optional implementation, the first communication card is in an inactive state, and the device further includes a transmitting unit 704.

The transmitting unit 704 is configured to transmit the paging cause in the paging message to the NAS of the terminal device through an AS of the terminal device.

The determining unit 702 is configured to determine second information through the NAS of the terminal device based on the paging cause.

The transmitting unit 704 is also configured to transmit the second information to the AS of the terminal device through the NAS of the terminal device, and initiate an RRC connection resume process based on the second information through the AS of the terminal device.

In an optional implementation, the second information includes at least one of: an access category, the access category being access category 0; an RRC connection cause, the RRC connection cause being an mt-Access; or second indication information, the second indication information being used for indicating whether the first communication card responds to the paging message.

In an optional implementation, the second information includes at least one of: an access category, the access category being access category 3; an RRC connection cause, the RRC connection cause being an mo-Signalling; or second indication information, the second indication information being used for indicating whether the first communication card responds to the paging message.

In an optional implementation, the transmitting unit 704 is configured to transmit an RRC connection resume request message to the first network through the AS of the terminal device. In a case where the second indication information indicates that the terminal device does not respond to the paging message, the RRC connection resume request message carries third indication information for indicating that the terminal device does not respond to the paging message.

In an optional implementation, the transmitting unit 704 is configured to transmit an RRC connection resume request message to the first network through the AS of the terminal device. In a case where the second indication information indicates that the terminal device does not respond to the paging message, a first LCID of a CCCH corresponding to the RRC connection resume request message is used for indicating that the terminal device does not respond to the paging message.

In an optional implementation, the determining unit 702 is configured to determine whether to respond to the paging message through an AS of the terminal device based on the paging cause in the paging message.

In an optional implementation, the first communication card is in an inactive state, and the device also includes a transmitting unit 704.

The transmitting unit 704 is configured to transmit an RRC connection resume request message to the first network through the AS of the terminal device. In a case where the AS determines not to respond to the paging message, the RRC connection resume request message carries third indication information for indicating that the terminal device does not respond to the paging message.

In an optional implementation, the first communication card is in an inactive state, and the device also includes a transmitting unit 704.

The transmitting unit 704 is configured to transmit an RRC connection resume request message to the first network through the AS of the terminal device. In a case where the AS determines not to respond to the paging message, a first LCID of a CCCH corresponding to the RRC connection resume request message is used for indicating that the terminal device does not respond to the paging message.

In an optional implementation, a header corresponding to the RRC connection resume request message in an MAC TB is a first header, and an LCID in the first header is the first LCID.

It is to be understood by those skilled in the art that the description of the communication apparatus described above in the embodiments of the present disclosure may be understood with reference to the description of the communication method in the embodiments of the present disclosure.

Figure 8:
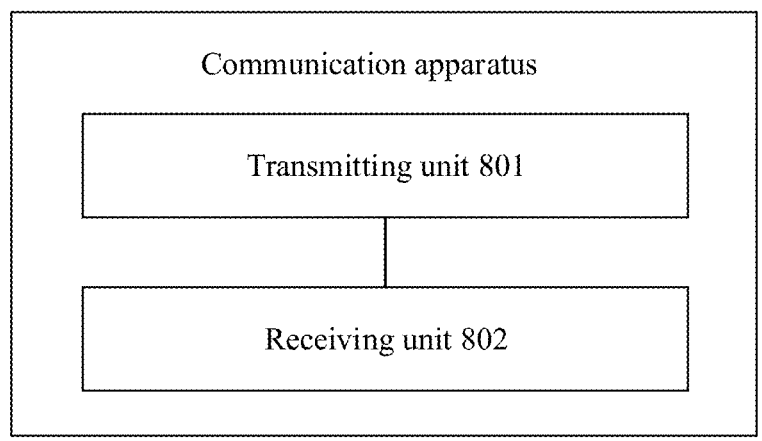
FIG. 8 is a second schematic structural composition diagram of a communication apparatus according to an embodiment of the present disclosure.

FIG. 8 is a second schematic structural composition diagram of a communication apparatus according to an embodiment of the present disclosure, which is applied to a first base station. As illustrated in FIG. 8, the communication apparatus includes a transmitting unit 801 and a receiving unit 802.

The transmitting unit 801 is configured to transmit a paging message to a terminal device. The first base station is a base station corresponding to a first communication card in the terminal device, and a paging cause in the paging message is used for the terminal device to determine whether to respond to the paging message.

The receiving unit 802 is configured to receive indication information from the terminal device. The indication information is used for indicating that the terminal device does not respond to the paging message.

In an optional implementation, the receiving unit 802 is configured to receive an RRC connection resume request message from the terminal device, and the RRC connection resume request message carries third indication information used for indicating that the terminal device does not respond to the paging message.

In an optional implementation, the receiving unit 802 is configured to receive an RRC connection resume request message from the terminal device, and a first LCID of a CCCH corresponding to the RRC connection resume request message is used for indicating that the terminal device does not respond to the paging message.

In an optional implementation, a header corresponding to the RRC connection resume request message carried in an MAC TB is a first header, and an LCID in the first header is the first LCID.

In an optional implementation, the transmitting unit 801 is also configured to transmit a context request message to a second base station. The context request message carries fourth indication information, and the fourth indication information is used for indicating that the terminal device does not respond to the paging message, and/or used for the second base station to decide not to migrate a context of the terminal device.

The receiving unit 802 is also configured to receive a context request failure message from the second base station, and the context request failure message carries an RRC release message.

The transmitting unit 801 is also configured to transmit the RRC release message to the terminal device.

In an optional implementation, the fourth indication information is forwarded to a core network control plane network element by the second base station, and the fourth indication information is used for the core network control plane network element to inform a core network user plane network element to stop transmitting downlink data of the terminal device to the second base station and buffer the downlink data.

In an optional implementation, the paging message is triggered by the second base station and the paging cause in the paging message is informed to the second base station by the core network control plane network element.

In an optional implementation, the second base station is an anchor base station.

It is to be understood by those skilled in the art that the description of the communication apparatus described above in the embodiments of the present disclosure may be understood with reference to the description of the communication method in the embodiments of the present disclosure.

Figure 9:
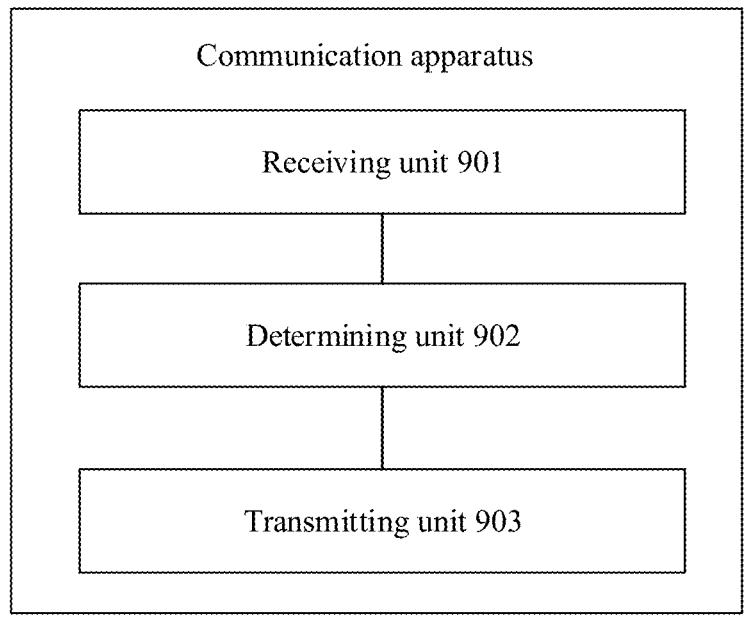
FIG. 9 is a third schematic structural composition diagram of a communication apparatus according to an embodiment of the present disclosure.

FIG. 9 is a third schematic structural composition diagram of a communication apparatus according to an embodiment of the present disclosure, which is applied to a terminal device. As illustrated in FIG. 9, the communication apparatus includes a receiving unit 901, a determining unit 902, and a transmitting unit 903.

The receiving unit 901 is configured to receive service data from a second network. The second network is a network corresponding to a second communication card in the terminal device, and the terminal device further has a first communication card.

The determining unit 902 is configured to determine a radio resource control (RRC) connection cause of the first communication card.

The transmitting unit 903 is configured to transmit an RRC connection establishment request message or an RRC connection resume request message to a first network based on the RRC connection cause. The first network is a network corresponding to the first communication card of the terminal device.

In an optional implementation, the transmitting unit 903 is also configured to transmit the RRC connection cause to an AS of the terminal device through an NAS of the terminal device, and transmit the RRC connection establishment request message or the RRC connection resume request message to the first network based on the RRC connection cause through the AS of the terminal device.

In an optional implementation, the RRC connection cause is an MO-signalling or an MO-data.

In an optional implementation, the RRC connection cause is an emergency or a highPriorityAccess.

In an optional implementation, the RRC connection cause is an mo-VoiceCall, or an mo-VideoCall, or an mo-SMS.

In an optional implementation, the RRC connection cause is an mps-PriorityAccess or an mcs-PriorityAccess.

In an optional implementation, the RRC connection cause is a radio access network notification area update (ma-Update).

In an optional implementation, the transmitting unit 903 is also configured to transmit an RRC connection release request message to the second network.

It is to be understood by those skilled in the art that the description of the communication apparatus described above in the embodiments of the present disclosure may be understood with reference to the description of the communication method in the embodiments of the present disclosure.

Figure 10:
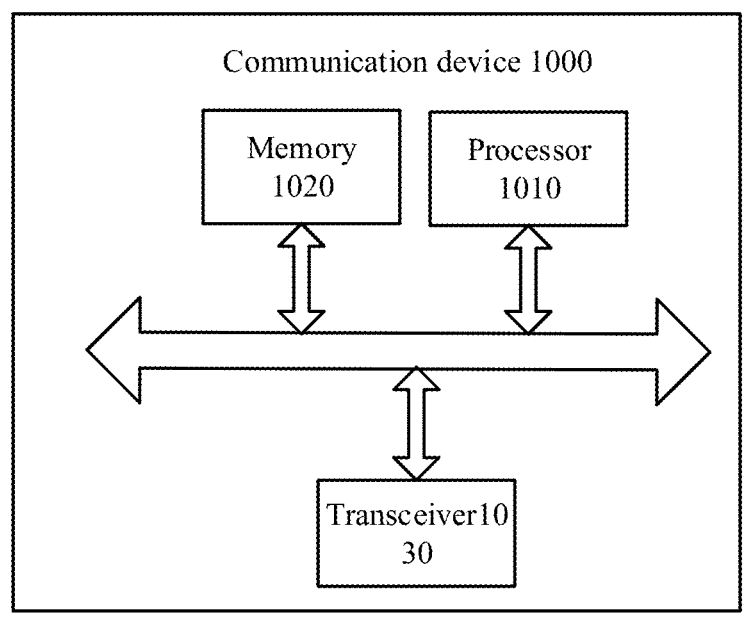
FIG. 10 is a schematic structural diagram of a communication device according to an embodiment of the present disclosure.

FIG. 10 is a schematic structural diagram of a communication device 1000 according to an embodiment of the present disclosure. The communication device may be the terminal device or the network device (such as, the first base station) The communication device 1000 illustrated in FIG. 10 includes a processor 1010. The processor 1010 may call a computer program from a memory and run the computer program to perform the method in the embodiments of the present disclosure.

In one example, as illustrated in FIG. 10, the communication device 1000 may also include a memory 1020. The processor 1010 may call a computer program from the memory 1020 and run the computer program to perform the method in the embodiments of the present disclosure.

The memory 1020 may be a separate device from the processor 1010, or may be integrated into the processor 1010.

In one example, as illustrated in FIG. 10, the communication device 1000 may also include a transceiver 1030. The processor 1010 may control the transceiver 1030 to communicate with another device, specifically, to transmit information or data to another device, or receive information or data from another device.

The transceiver 1030 may include a transmitter and a receiver. The transceiver 1030 may further include one or more antennas.

In one example, the communication device 1000 may specifically be the network device in the embodiments of the present disclosure. The communication device 1000 may implement a corresponding process implemented by the network device in each method of the embodiments of the present disclosure, which will not be elaborated herein for brief description.

In one example, the communication device 1000 may specifically be the mobile terminal/terminal device in the embodiments of the present disclosure. The communication device 1000 may implement a corresponding process implemented by the mobile terminal/terminal device in each method of the embodiments of the disclosure, which will not be elaborated herein for brief description.

Figure 11:
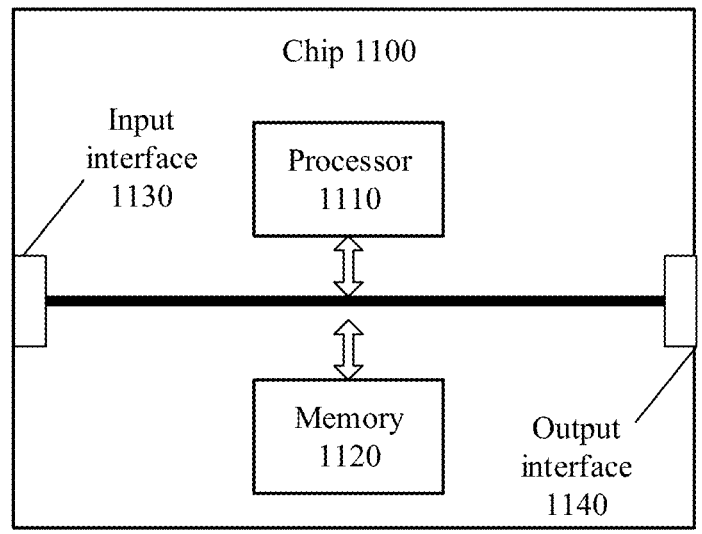
FIG. 11 is a schematic structural diagram of a chip according to an embodiment of the present disclosure.

FIG. 11 is a schematic structural diagram of a chip according to an embodiment of the present disclosure. The chip 1100 illustrated in FIG. 11 includes a processor 1110. The processor 1110 can call a computer program from a memory and run the computer program to perform the method in the embodiments of the present disclosure.

In one example, as illustrated in FIG. 11, the chip 1100 may also include a memory 1120. The processor 1110 may call a computer program from the memory 1120 and run the computer program to perform the method in the embodiments of the present disclosure.

The memory 1120 may be a separate device from the processor 1110, or may be integrated in the processor 1110.

In one example, the chip 1100 may also include an input interface 1130. The processor 1110 may control the input interface 1130 to communicate with another device or chip, and specifically, may acquire information or data transmitted by another device or chip.

In one example, the chip 1100 may also include an output interface 1140. The processor 1110 may control the output interface 1140 to communicate with another device or chip, and specifically, may output information or data to another device or chip.

In one example, the chip may be applied to the network device in the embodiments of the present disclosure. The chip may implement a corresponding process implemented by the network device in each method of the embodiments of the disclosure, which will not be elaborated herein for brief description.

In one example, the chip may be applied to the mobile terminal/terminal device in the embodiments of the present disclosure. The chip may implement a corresponding process implemented by the mobile terminal/terminal device in each method of the embodiments of the disclosure, which will not be elaborated herein for brief description.

It is to be understood that in the embodiments of the disclosure, the chip may also be referred to as a system level chip, a system chip, a chip system or a system-on-chip.

Figure 12:
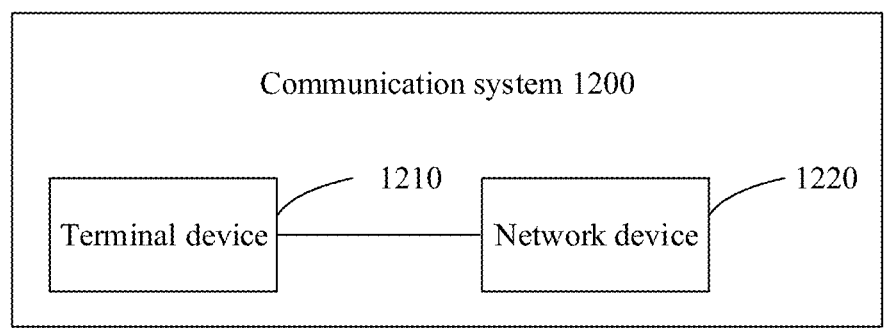
FIG. 12 is a schematic block diagram of a communication system according to an embodiment of the present disclosure.

FIG. 12 is a schematic block diagram of a communication system 1200 according to an embodiment of the present disclosure. As illustrated in FIG. 12, the communication system 1200 includes a terminal device 1210 and a network device 1220.

The terminal device 1210 may implement the corresponding functions implemented by the terminal device in the above methods, and the network device 1220 may implement the corresponding functions implemented by the network device in the above methods. Details will not be elaborated herein for brief description.

It is to be understood that in the embodiments of the disclosure, the processor may be an integrated circuit chip with a signal processing capability. In an implementation process, each operation of the method embodiments may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It is to be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other suitable type.

The embodiments of the disclosure also provide a computer-readable storage medium for storing one or more computer programs.

In one embodiment, the computer-readable storage medium may be applied in the network device of the embodiments of the disclosure. The computer programs may enable a computer to perform the corresponding process implemented by the network device in each method of the embodiments of the disclosure, which will not be elaborated herein for brief description.

In one example, the computer-readable storage medium may be applied in the mobile terminal/terminal device of the embodiments of the disclosure. The computer programs may enable a computer to perform the corresponding process implemented by the mobile terminal/terminal device in each method of the embodiments of the disclosure, which will not be elaborated herein for brief description.

The embodiments of the disclosure also provide a computer program product. The computer program product includes one or more computer program instructions.

In one embodiment, the computer program product may be applied in the network device of the embodiments of the disclosure. The computer program instructions may enable a computer to perform the corresponding process implemented by the network device in each method of the embodiments of the disclosure, which will not be elaborated herein for brief description.

In one example, the computer program product may be applied in the mobile terminal/terminal device of the embodiments of the disclosure. The computer program instructions may enable a computer to perform the corresponding process implemented by the mobile terminal/terminal device in each method of the embodiments of the disclosure, which will not be elaborated herein for brief description.

The embodiments of the disclosure also provide a computer program.

In one embodiment, the computer program may be applied in the network device of the embodiments of the disclosure. The computer program, when executed by a computer, enables the computer to perform the corresponding process implemented by the network device in each method of the embodiments of the disclosure, which will not be elaborated herein for brief description.

In one example, the computer program may be applied in the mobile terminal/terminal device of the embodiments of the disclosure. The computer program, when executed by a computer, enables the computer to perform the corresponding process implemented by the mobile terminal/terminal device in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
   receiving, by a terminal device, a paging message from a first network and service data from a second network, the first network being a Long Term Evolution (LTE) network or a New Radio (NR) network corresponding to a first communication card in the terminal device, the second network being an NR network corresponding to a second communication card in the terminal device, the first communication card being in an idle state and the second communication card being in a connected state;
   determining, by the terminal device, whether to respond to the paging message based on a paging cause in the paging message, and indicating to the first network that the terminal device does not respond to the paging message in response to determining not to respond to the paging message;
   wherein determining, by the terminal device, whether to respond to the paging message based on the paging cause in the paging message comprises:
   determining, by a Non-Access Stratum (NAS) of the terminal device, whether to respond to the paging message based on the paging cause in the paging message;
   the method further comprises:
   transmitting, by an Access Stratum (AS) of the terminal device, the paging cause in the paging message to the NAS of the terminal device;
   determining, by the NAS of the terminal device, first information based on the paging cause and transmitting the first information to the AS of the terminal device; and
   initiating, by the AS of the terminal device, a radio resource control (RRC) connection establishment process based on an access category in the first information.

2. The method of claim 1, wherein the access category is access category 0, and the first information further comprises at least one of:
   an RRC connection cause, the RRC connection cause being an mt-Access; or
   an NAS message, the NAS message being a service request message.

3. The method of claim 1, wherein initiating, by the AS of the terminal device, the RRC connection establishment process based on the access category in the first information comprises:

determining, by the AS of the terminal device, whether to allow access to the first network based on the access category; and
   transmitting, by the AS of the terminal device in a case where the access to the first network is allowed, an RRC connection establishment request message to the first network, the RRC connection establishment request message carrying the RRC connection cause.

4. The method of claim 3, further comprising:
   receiving, by the AS of the terminal device, an RRC connection establishment message from the first network, and transmitting an RRC connection establishment completion message to the first network, the RRC connection establishment completion message carrying the NAS message.

5. The method of claim 1, wherein the access category is access category 3, and the first information further comprises at least one of:
   an RRC connection cause, the RRC connection cause being an mo-Signalling; or
   an NAS message, the NAS message carrying first indication information, and the first indication information being used for indicating that the terminal device does not respond to the paging message, and/or, instructing a core network to stop paging the terminal device.

6. A terminal device comprising: a processor and a memory, wherein
   the memory is configured to store a program, and
   the processor is configured to call and run the program in the memory, to cause the terminal device to:
   receive a paging message from a first network and service data from a second network, the first network being a Long Term Evolution (LTE) network or a New Radio (NR) network corresponding to a first communication card in the terminal device, the second network being an NR network corresponding to a second communication card in the terminal device, the first communication card being in an idle state and the second communication card being in a connected state;
   determine whether to respond to the paging message based on a paging cause in the paging message, and indicate to the first network that the terminal device does not respond to the paging message in response to determining not to respond to the paging message;
   wherein the processor is further configured to call and run the program in the memory to cause the terminal device to:
   determine whether to respond to the paging message through a Non-Access Stratum (NAS) of the terminal device based on the paging cause in the paging message;
   transmit the paging cause in the paging message to the NAS of the terminal device through an Access Stratum (AS) of the terminal device;
   determine first information based on the paging cause and transmit the first information to the AS of the terminal device through the NAS of the terminal device; and
   initiate a radio resource control (RRC) connection establishment process through the AS of the terminal device based on an access category in the first information.

7. The device of claim 6, wherein the access category is access category 0, and the first information further comprises at least one of:
   an RRC connection cause, the RRC connection cause being an mt-Access; or
   an NAS message, the NAS message being a service request message.

8. The device of claim 7, wherein
the processor is configured to call and run the program in the memory to cause the terminal device to:
determine whether to allow access to the first network through the AS of the terminal device based on the access category; and
in a case where the access to the first network is allowed, transmit an RRC connection establishment request message to the first network through the AS of the terminal device, the RRC connection establishment request message carrying the RRC connection cause.

9. The device of claim 8, wherein the processor is configured to call and run the program in the memory to cause the terminal device to:
receive an RRC connection establishment message from the first network through the AS of the terminal device; and
transmit an RRC connection establishment completion message to the first network, the RRC connection establishment completion message carrying the NAS message.

10. The device of claim 6, wherein the access category is access category 3, and the first information further comprises at least one of:
an RRC connection cause, the RRC connection cause being an mo-Signalling; or
an NAS message, the NAS message carrying first indication information, and the first indication information being used for indicating that the terminal device does not respond to the paging message, and/or, instructing a core network to stop paging the terminal device.

11. A non-transitory computer readable storage medium, configured to store a computer program that causes a processor of a terminal device to perform a communication method, comprising:
receiving a paging message from a first network and service data from a second network, the first network being a Long Term Evolution (LTE) network or a New Radio (NR) network corresponding to a first communication card in the terminal device, the second network being an NR network corresponding to a second communication card in the terminal device, the first communication card being in an idle state and the second communication card being in a connected state;
determining whether to respond to the paging message based on a paging cause in the paging message, and indicating to the first network that the terminal device does not respond to the paging message in response to determining not to respond to the paging message;
wherein determining, by the terminal device, whether to respond to the paging message based on the paging cause in the paging message comprises:
determining whether to respond to the paging message through a Non-Access Stratum (NAS) of the terminal device based on the paging cause in the paging message;
the method further comprises:
transmitting the paging cause in the paging message to the NAS of the terminal device through an Access Stratum (AS) of the terminal device;
determining first information based on the paging cause and transmitting the first information to the AS of the terminal device through the NAS of the terminal device; and
initiating a radio resource control (RRC) connection establishment process through the AS of the terminal device based on an access category in the first information.

* * * * *